: 3,712,790
Patented Jan. 23, 1973

3,712,790
2,6-DIMETHYL PHENOL COUPLERS AND OXIDATION DYES FOR DYEING HUMAN HAIR
Gregoire Kalopissis, Paris, Andree Bugaut, Boulogne-sur-Seine, and Hubert Gaston-Breton, Paris, France, assignors to Societe Anonyme dite: l'Oreal, Paris, France
No Drawing. Filed Aug. 7, 1969, Ser. No. 848,329
Claims priority, application Luxembourg, Aug. 14, 1968, 56,722
Int. Cl. A61k 7/12
U.S. Cl. 8—10.2     6 Claims

ABSTRACT OF THE DISCLOSURE

Oxidation dye coupling compounds for use in dyeing live human hair having the formula:

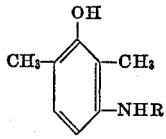

(I)

SUMMARY OF THE INVENTION

Certain conventional methods of dyeing keratinic fibers and particularly human hair comprise the application thereto of dyeing compositions which contain oxidation dyes and in particular aromatic ortho- or para-diamines and ortho or para aminophenols, which are generally referred to as "oxidation bases." The shade obtained with these bases may be varied by using color modifiers or "couplers," and in particular aromatic meta-diamines or meta-aminophenols.

An object of the present invention is to provide a new class of couplers which may be utilized with known oxidation dyes.

The present invention is directed to new oxidation dye coupling compounds which have the formula:

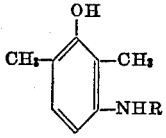

(I)

in which R is hydrogen, an alkyl, hydroxyalkyl, or acyl radical or a N-alkylated or unsubstituted aminoalkyl or carbamylmethyl group, the alkyl groups of these redicals having 1–6 carbon atoms and preferably 1–4 carbon atoms.

3-amino-2, 6-dimethyl phenol, which constitutes the first member of this family of compounds, may be obtained by reducing the corresponding nitro compound, for example by using iron in an acetic acid medium as the reducing agent.

The N-acyl compound may be prepared by reacting the corresponding acid anhydride on 3-amino-2, 6-dimethyl phenol, while the compounds of Formula I in which R represents an alkyl, hydroxy alkyl, amino alkyl, or carbamyl methyl radical may be obtained by reacting a suitably selected halogenated derivative on 3-amino-2, 6-dimethyl phenol.

Another object of the invention is to provide a new composition for dyeing keratinic fibers, and in particular live human hair, which is essentially characterized by the fact that it contains, in association with at least one conventional oxidation base, at least one compound having the above Formula I.

Among the illustrative oxidation bases which may be used in association with the couplers of Formula I are: para-phenylenediamine, para-toluylenediamine, para-aminophenol, N-methyl-para-aminophenol, chloro-para-phenylenediamine, methoxy-para-phenyldiamine, 6-methoxy-3-methyl-para-phenylenediamine, (N-ethyl, N-carbamyl-ethyl)-para-phenylenediamine, and 2,5-diamino-pyridine.

Among the illustrative couplers of Formula I are: 3-amino-2, 6-dimethyl phenol; 3-acetylamino-2,6-dimethyl phenol and 3-carbamylmethylamino - 2,6-dimethyl phenol.

These new couplers produce particularly stable colors within the blue to red range when associated with oxidation bases.

In the dyeing composition of the invention the base to coupler ratio may vary within broad limits but there is preferably an excess of coupler.

The dyeing composition of this invention may also contain other dyes suitable for use under the same conditions, such as direct dyes, for example azo or anthraquinone dyes, or dyes obtained by associating bases and couplers other than those which constitute the subject matter of the present invention.

The compositions of this invention may also contain wetting agents, dispersing agents, penetrating agents, or other ingredients conventionally used in the dyeing of hair. They may take the form of an aqueous solution, a cream or a gel. The dyeing compositions of this invention are used in a conventional manner at an alkaline pH, preferably between 8 and 10, this pH being obtained by addition of, for example, ammonia, and they are applied to the hair in the presence of an oxidizing solution, which is preferably a hydrogen peroxide solution.

It is a further object of the present invention to provide a new method of dyeing hair which is characterized by the fact that after having made it alkaline by aid of, for example, ammonia, hydrogen peroxide is added to a dyeing composition such as the one described above and the resulting mixture is applied to the hair. The hair is then rinsed, shampooed and dried.

The following examples illustrate the different forms of the invention. The percentages mentioned in these examples are by weight, and the temperatures are indicated in degree centigrade.

EXAMPLES OF PREPARATION

Example 1

Preparation of 3-amino-2,6-dimethyl phenol.—157 g. (0.94 mole) of 2,6-dimethyl-3-nitro phenol is added little by little, while stirring, to a reducing mixture consisting of 950 cm.³ of water, 30 cm.³ of acetic acid and 158 g. of iron, which has first been heated to 70°. When this addition has been completed, the heating is continued for 20 minutes. The reaction mixture is then neutralized with sodium carbonate and the boiling liquid is filtered. After cooling the filtrate, drying yields 80 g. of 3-amino-2,6-dimethyl phenol which, after recrystallization in benzene, melts at 104°.

*Analysis.*—Calculated for $C_8H_{10}ON$ (percent): C, 70.07; H, 8.03; N, 10.22. Found (percent): C, 70.03; H, 7.98; N, 10.00–10.20.

Example 2

Preparation of 3-acetylamino-2,6-dimethyl phenol.— 39.7 g. (0.29 mole) of 3-amino-2,6-dimethyl phenol is dissolved in 200 cm.³ of boiling water. 41 g. (0.5 mole) of acetic anhydride is then added to this solution. The reaction mixture is kept in a boiling water bath for 10 minutes, cooled, and drying yields 40 g. of 3-acetylamino-2,6-dimethyl phenol in practically pure form which, after recrystallization in ethyl acetate, melts at 158°.

Example 3

Preparation of 3-propionylamino-2,6-dimethyl phenol.—4.5 g. (0.03 mole) of 3-amino-2,6-dimethyl phenol is dissolved in 30 cm.³ of ethyl acetate. 4 cm.³ of propionic anhydride is added and the mixture heated at reflux for 30 minutes. After cooling, drying yields 4.4 g. of 3-propionylamino-2,6-dimethyl phenol which after recrystallization in ethyl acetate, melts at 140°.

Example 4

Preparation of 3 - carbamylmethylamino-2,6-dimethyl phenol.—10.96 g. (0.08 mole) of 3-amino-2,6-dimethyl phenol and 7.7 g. (0.082 mole) of chloroacetamide are dissolved in 66 cm.³ of a 50–50 mixture of ethanol and water which has been heated to reflux. 5.6 g. of calcium carbonate in suspension in 12 cm.³ of water is then added, and reflux is continued for 4 hours. The boiling liquid is then filtered. After cooling the filtrate, drying yields 10.4 g. of 3-N-carbamylmethylamino - 2,6 - dimethyl phenol which, after recrystallization in ethanol, melts at 159°.

EXAMPLES OF APPLICATION

Example 5

The following dyeing solution is prepared:

|  | G. |
|---|---|
| 3-N-carbamylmethylamino-2,6-dimethyl phenol | 0.485 |
| Para-toluylenediamine | 0.3 |
| 20% ammonium lauryl sulfate, that is to say, aqueous ammonium lauryl sulfate solution, the concentration of which is 20% as referred to lauryl alcohol | 20 |
| Ethylene diamino tetra-acetic acid | 0.3 |
| 20% ammonia | 10 |
| 40% sodium bisulfite | 1 |
| Water, q.s.p. | 100 |

When this solution is mixed with an equal weight of 6% hydrogen peroxide and applied for 30 minutes to 100% white hair, a violine color is produced.

Example 6

The following dyeing solution is prepared:

|  | G. |
|---|---|
| 3-propionylamino-2,6-dimethyl phenol | 0.482 |
| Para-toluylenediamine | 0.3 |
| 20% lauryl ammonium sulfate | 20 |
| Ethylene diamino tetra-acetic acid | 0.3 |
| 20% ammonia | 15 |
| 40% sodium bisulfite | 1 |
| Water, q.s.p. | 100 |

When this solution is mixed with an equal weight of 6% hydrogen peroxide and applied for 30 minutes to 100% white hair, a blue gray color is produced.

Example 7

The following dyeing solution is prepared:

|  | G. |
|---|---|
| Para-toluylenediamine | 1 |
| Para-aminophenol | 0.4 |
| Resorcinol | 0.1 |
| 3-amino-2,6-dimethyl phenol | 1.7 |
| 20% lauryl ammonium sulfate | 20 |
| Ethylene diamino tetra-acetic acid | 0.3 |
| 20% ammonia | 10 |
| 40% sodium bisulfite | 1 |
| Water, q.s.p. | 100 |

This solution, when mixed with an equal weight of 6% hydrogen peroxide and applied for 30 minutes to 100% white hair, produces an eggplant color.

Example 8

The following dyeing solution is prepared:

|  | G. |
|---|---|
| Para-toluylenediamine | 1 |
| 3-acetylamino-2,6-dimethyl phenol | 1.3 |
| 20% lauryl ammonium sulfate | 20 |
| Ethylene diamino tetra-acetic acid | 0.3 |
| 20% ammonia | 10 |
| 40% sodium bisulfite | 1 |
| Water, q.s.p. | 100 |

When this solution is mixed with an equal weight of 6% hydrogen peroxide and applied for 30 minutes to 100% white hair, a violet blue shade is produced.

Example 9

The following dyeing solution is prepared:

|  | G. |
|---|---|
| 3-acetylamino-2,6-dimethyl phenol | 1 |
| Para-aminophenol | 1.5 |
| 20% lauryl ammonium sulfate | 20 |
| Ethylene diamino tetra-acetic acid | 0.3 |
| 20% ammonia | 10 |
| 40% sodium bisulfite | 1 |
| Water, q.s.p. | 100 |

When this solution is mixed with an equal weight of 6% hydrogen peroxide and applied for 30 minutes to 100% white hair, a reddish blond color results.

Example 10

The following dyeing solution is prepared:

|  | G. |
|---|---|
| Para-toluylenediamine | 1 |
| 3-acetylamino-2,6-dimethyl phenol | 1 |
| Resorcinol | 1.5 |
| 3 - methoxy - 2,6 - dimethyl - para-phenylenediamine dihydrochloride | 2.5 |
| 4 - γ - aminopropylamino - 1 - methylamino-anthraquinone | 1 |
| 20% lauryl ammonium sulfate | 20 |
| Ethylene diamino tetra-acetic acid | 0.3 |
| 20% ammonia | 10 |
| 40% sodium bisulfite | 1 |
| Water, q.s.p. | 100 |

When this solution is mixed with an equal weight of 6% hydrogen peroxide and applied for 30 minutes to 100% white hair, a bluish black shade results.

The oxidation dye coupler compositions of this invention may be placed in any suitable carrier such as water, alcohol, etc., and they may be in any suitable form such as solution, gel, cream, aerosol, etc. Suitable carriers, gelling agents, aerosol compositions, etc., are set forth in many text books, such as Cosmetic Compositions Vol. I and II by Harry.

Illustrative coupling compounds of this invention are:

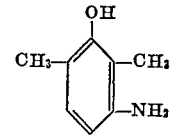

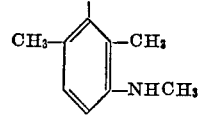

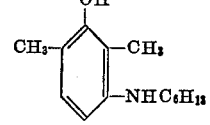

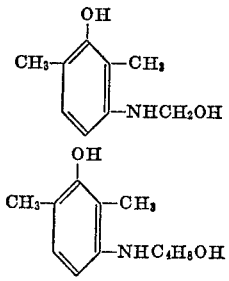

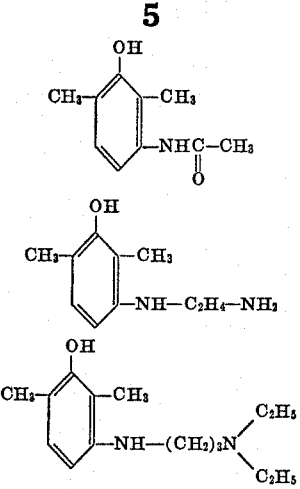

What is claimed is:
1. A composition for dyeing keratinic fibers and live human hair comprising an aqueous alkaline solution having a pH of 8–10 of a mixture of an oxidation base present in amounts sufficient to color said fibers or hair and a molar excess of a coupler relative to said oxidation base, said coupler being selected from the group consisting of 3-amino-2,6-dimethyl phenol, 3-acetylamino-2,6-dimethyl phenol, 3-propionylamino-2, 6-dimethyl phenol, 3-carbamylmethylamino-2,6-dimethyl phenol,

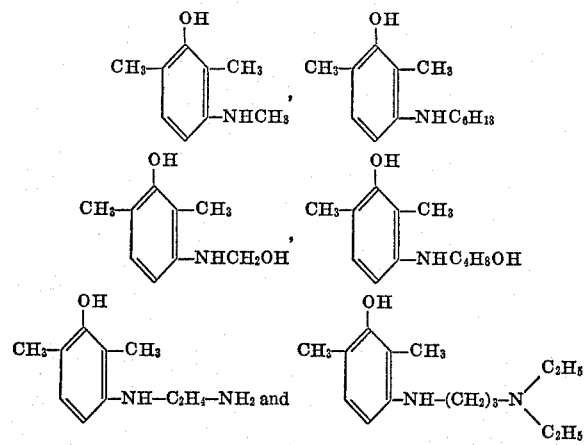

said oxidation base being selected from the group consisting of para-phenylenediamine, para-toluylenediamine, para-aminophenol, N-methyl-para-aminophenol, chloro-para-phenylenediamine, methoxy-para-phenylenediamine, 3-methoxy-2,6-dimethyl para-phenylenediamine, 6-methoxy - 3 - methyl - paraphenylenediamine, (N-ethyl, N-carbamylethyl)-para-phenylenediamine and 2,5-diaminopyridine.

2. A composition for dyeing keratinic fibers and live human hair comprising an aqueous carrier, an oxidation base present in amounts sufficient to color said fibers or hair and a molar excess of a coupler relative to said oxidation base, said composition having a pH of 8–10 and said coupler having the formula

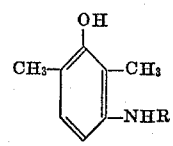

wherein R is selected from the group consisting of hydrogen, lower alkyl having 1–6 carbon atoms, hydroxyalkyl having 1–6 carbon atoms, acetyl, propionyl, aminoalkyl wherein the alkyl moiety has 1–6 carbon atoms, N-alkylated aminoalkyl wherein each of the alkyl moieties has 1–6 carbon atoms, and carbamylmethyl.

3. The composition of claim 2 wherein said oxidation base is selected from the group consisting of para-phenylenediamine, para-toluylenediamine, para-aminophenol, N-methyl-para-aminophenol, chloro-para - phenylenediamine, methoxy-para-phenylenediamine, 3-methoxy-2,6-dimethyl-para - phenylenediamine, 6-methoxy-3-methyl-para-phenylenediamine, (N-ethyl, N - carbamylethyl)-para-phenylenediamine and 2,5-diaminopyridine.

4. The composition of claim 2 containing ammonia in amounts effective to impart thereto said pH.

5. The composition of claim 2 which also includes hydrogen peroxide in amounts effective to oxidize said oxidation base.

6. A method of dyeing live human hair comprising applying to said hair in amounts effective to dye the same, the composition of claim 5, rinsing, shampooing and drying said hair.

References Cited
UNITED STATES PATENTS

| | | | |
|---|---|---|---|
| 1,920,828 | 8/1933 | Wyler | 260—575 |
| 2,040,183 | 5/1936 | Ostromislensky | 260—575 X |
| 3,053,895 | 9/1962 | Kaeding | 260—574 |
| 3,210,252 | 10/1965 | Blanke et al. | 8—10.2 |
| 3,226,361 | 12/1965 | Borman | 260—47 ET |
| 3,413,073 | 11/1968 | Bugaut et al. | 8—11 |
| 3,415,608 | 12/1968 | Tucker | 8—10.2 |

ALBERT T. MEYERS, Primary Examiner

V. C. CLARKE, Assistant Examiner

U.S. Cl. X.R.

8—11; 260—562, 570.8, 573, 574, 575